United States Patent
Li et al.

(10) Patent No.: US 11,399,076 B2
(45) Date of Patent: Jul. 26, 2022

(54) PROFILE INFORMATION SHARING

(71) Applicant: Nokia Technologies Oy, Espoo (FI)

(72) Inventors: Hongwei Li, Cambridge (GB); Troels Roennow, Cambridge (GB); Khan Baykaner, Cambridgeshire (GB); Krishna Dubba, Bishops Stortford (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/971,218

(22) PCT Filed: Feb. 12, 2019

(86) PCT No.: PCT/FI2019/050110
§ 371 (c)(1),
(2) Date: Aug. 19, 2020

(87) PCT Pub. No.: WO2019/162563
PCT Pub. Date: Aug. 29, 2019

(65) Prior Publication Data
US 2021/0105337 A1     Apr. 8, 2021

(30) Foreign Application Priority Data
Feb. 20, 2018 (EP) .................... 18157638

(51) Int. Cl.
*H04L 67/306* (2022.01)
*H04L 9/40* (2022.01)
(Continued)

(52) U.S. Cl.
CPC ........... *H04L 67/306* (2013.01); *H04L 63/08* (2013.01); *H04L 63/102* (2013.01); *H04L 67/34* (2013.01); *H04W 8/20* (2013.01)

(58) Field of Classification Search
CPC ..... H04L 67/306; H04L 63/08; H04L 63/102; H04L 67/34; H04W 8/20
(Continued)

(56) References Cited

U.S. PATENT DOCUMENTS 7,630,986 B1    12/2009  Herz et al.
8,108,666 B2 *   1/2012  Baskey ............. H04M 1/72448
                                                    713/100
(Continued)

FOREIGN PATENT DOCUMENTS

CN      106407808 A       2/2017
WO      2018/069566 A1    4/2018
WO      2018/073482 A1    4/2018

OTHER PUBLICATIONS

"Natarajan, Harish; Krause, Solvej; Gradstein, Helen. 2017. Distributed Ledger Technology and Blockchain. FinTech Note;No. 1. World Bank, Washington, DC. © World Bank. https://openknowledge.worldbank.org/handle/10986/29053 License: CC By 3.0 IGO." (Year: 2017).*

(Continued)

*Primary Examiner* — Melvin H Pollack
(74) *Attorney, Agent, or Firm* — Laine IP Oy (57) ABSTRACT

According to an example aspect, there is provided a method for obtaining profile information by a node of a distributed network. Need for providing profile information for a user by a node of a second local private network is detected. A profile request transaction is provided to a public distributed ledger for obtaining profile information associated with the user. Profile information associated with the user is received from a providing node capable of accessing a first private distributed ledger storing the profile information. At least some of the received user profile information is provided for at least one device connected to the second local private network.

20 Claims, 6 Drawing Sheets

(51) Int. Cl.
*H04L 67/00* (2022.01)
*H04W 8/20* (2009.01)

(58) Field of Classification Search
USPC .................................................. 709/204
See application file for complete search history.

(56) References Cited

U.S. PATENT DOCUMENTS

| | | | |
|---|---|---|---|
| 8,266,269 B2* | 9/2012 | Short | H04W 12/088 709/223 |
| 8,266,438 B2* | 9/2012 | Orsini | G06F 21/62 713/176 |
| 8,316,082 B2* | 11/2012 | Igarashi | H04N 21/2747 709/203 |
| 8,769,270 B2* | 7/2014 | Orsini | H04L 9/0861 713/165 |
| 9,009,109 B2 | 4/2015 | Tan | |
| 9,229,905 B1 | 1/2016 | Penilla et al. | |
| 9,235,976 B2 | 1/2016 | Sloo et al. | |
| 9,305,162 B2 | 4/2016 | Yuen et al. | |
| 9,507,775 B1 | 11/2016 | Niles | |
| 9,742,857 B2* | 8/2017 | Mohammed | H04L 67/28 |
| 9,858,781 B1 | 1/2018 | Campero et al. | |
| 10,252,145 B2* | 4/2019 | Tran | A63F 13/211 |
| 10,587,609 B2* | 3/2020 | Ebrahimi | H04L 9/3297 |
| 10,601,800 B2* | 3/2020 | Kao | H04L 63/102 |
| 10,621,510 B2* | 4/2020 | Saxena | G06F 21/6245 |
| 10,701,054 B2* | 6/2020 | Padmanabhan | H04L 63/101 |
| 10,715,531 B2* | 7/2020 | Thekadath | H04L 63/123 |
| 10,735,346 B2* | 8/2020 | Nolan | H04L 47/821 |
| 10,749,681 B2* | 8/2020 | Andrade | H04L 9/0866 |
| 10,756,883 B2* | 8/2020 | Brehmer | H04L 9/3242 |
| 10,803,186 B2* | 10/2020 | Considine | G06F 11/3672 |
| 10,817,967 B2* | 10/2020 | Chabanne | H04L 9/32 |
| 10,831,764 B2* | 11/2020 | Ananthapur Bache | H04L 9/3239 |
| 10,872,077 B2* | 12/2020 | Wright, Sr. | G06Q 20/1235 |
| 10,873,570 B2* | 12/2020 | Chaudhri | H04L 67/1095 |
| 10,904,261 B2* | 1/2021 | Atanda | G06F 21/62 |
| 10,963,585 B2* | 3/2021 | Shah | G16H 10/60 |
| 10,970,638 B2* | 4/2021 | Palanichamy | G06Q 30/06 |
| 10,984,913 B2* | 4/2021 | Shah | G16H 10/60 |
| 11,004,072 B2* | 5/2021 | Georgiadis | H04L 9/3271 |
| 11,005,836 B2* | 5/2021 | Hanay | H04W 48/02 |
| 11,012,860 B2* | 5/2021 | Phan | H04L 63/064 |
| 11,025,626 B1* | 6/2021 | Todd | H04L 63/08 |
| 11,042,934 B2* | 6/2021 | Singh | G06Q 20/085 |
| 2006/0123081 A1 | 6/2006 | Baudino et al. | |
| 2011/0289308 A1* | 11/2011 | Sobko | G06F 21/56 713/100 |
| 2013/0276072 A1 | 10/2013 | Matti et al. | |
| 2014/0189107 A1 | 7/2014 | Kalavade | |
| 2015/0097663 A1 | 4/2015 | Sloo et al. | |
| 2015/0363777 A1 | 12/2015 | Ronca et al. | |
| 2016/0173930 A1 | 6/2016 | Jin | |
| 2017/0074536 A1 | 3/2017 | Bentz et al. | |
| 2017/0331896 A1 | 11/2017 | Holloway et al. | |
| 2018/0007131 A1 | 1/2018 | Cohn et al. | |
| 2018/0146061 A1 | 5/2018 | Oberdorfer | |
| 2018/0219676 A1 | 8/2018 | Mattingly et al. | |
| 2019/0147417 A1* | 5/2019 | Arora | G06Q 10/10 705/39 |
| 2019/0238316 A1* | 8/2019 | Padmanabhan | H04L 9/3297 |
| 2019/0349733 A1* | 11/2019 | Nolan | H04W 12/69 |
| 2021/0176638 A1* | 6/2021 | Heldt-Sheller | H04L 67/34 |

OTHER PUBLICATIONS

Shrestha A.K., Vassileva J. (2018) Blockchain-Based Research Data Sharing Framework for Incentivizing the Data Owners. In: Chen S., Wang H., Zhang LJ. (eds) Blockchain—ICBC 2018. ICBC 2018. Lecture Notes in Computer Science, vol. 10974. Springer, Cham. https://doi.org/10.1007/978-3-319-94478-4_19 (Year: 2018).*

P. Dunphy and F. A. P. Petitcolas, "A First Look at Identity Management Schemes on the Blockchain," in IEEE Security & Privacy, vol. 16, No. 4, pp. 20-29, Jul./Aug. 2018, doi: 10.1109/MSP.2018.3111247. (Year: 2018).*

A. S. Omar and O. Basir, "Identity Management in IoT Networks Using Blockchain and Smart Contracts," IEEE International Conference on Internet of Things (iThings) and (GreenCom) and (CPSCom) and SmartData, 2018, pp. 994-1000. (Year: 2018).*

Kouzinopoulos, C. S., Spathoulas, G., Giannoutakis, K. M., Votis, K., Pandey, P., Tzovaras, D., . . . & Nijdam, N. A. (Feb. 2018). Using blockchains to strengthen the security of internet of things. In International ISCIS Security Workshop (pp. 90-100). Springer, Cham. (Year: 2018).*

Hany F. Atlam, Ahmed Alenezi, Madini O. Alassafi, Gary B. Wills, "Blockchain with Internet of Things: Benefits, Challenges, and Future Directions", International Journal of Intelligent Systems and Applications(IJISA), vol. 10, No. 6, pp. 40-48, 2018. (Year: 2018).*

Adiseshu Hari and T. V. Lakshman. 2016. The Internet Blockchain: A Distributed, Tamper-Resistant Transaction Framework for the Internet. In Proceedings of the 15th ACM Workshop on Hot Topics in Networks (HotNets '16). Association for Computing Machinery, New York, NY, USA, 204-210. (Year: 2016).*

"How Blockchain Could End Travel Industry Pain Points", Coindesk, Retrieved on Jul. 2, 2020, Webpage available at : https://www.coindesk.com/blockchain-end-travel-industry-pain-points.

"Scenario 1: Using Smart Phones to Control Air Conditioning Remotely", IBM Knowledge Center, Retrieved on Jul. 2, 2020, Webpage available at : hhttps://www.ibm.com/support/knowledgecenter/en/SSWMAJ_2.0.0/com.ibm.ism.doc/Scenarios/sc00007_.html.

"Configure Remote Desktop Gateway Settings", Microsoft, Retrieved on Jul. 2, 2020, Webpage available at : https://docs.microsoft.com/en-us/previous-versions/windows/it-pro/windows-server-2008-R2-and-2008/cc772479(v=ws.11)?redirectedfrom=MSDN.

Extended European Search Report received for corresponding European Patent Application No. 18157638.0, dated Sep. 4, 2018, 9 pages.

International Search Report and Written Opinion received for corresponding Patent Cooperation Treaty Application No. PCT/FI2019/050110, dated Apr. 17, 2019, 19 pages.

* cited by examiner

PROFILE INFORMATION SHARING

RELATED APPLICATION

This application claims priority to PCT Application No. PCT/FI2019/050110, filed on Feb. 12, 2019, which claims priority to European Application No. 18157638.0, filed on Feb. 20, 2018, each of which is incorporated herein by reference in its entirety.

FIELD

Various example embodiments relate to sharing of profile information, and further to facilitate sharing of profile information between local networks of devices.

BACKGROUND

Number of devices connecting to local wireless networks is continuously increasing particularly due to increase of new IoT applications. For example, various household devices, such as fridges, entertainment systems, heating, air conditioning, water supply devices, are being equipped with wireless connectivity. At the same time, new features and applications are being added to these devices, causing increasing number of available options and associated settings to be available. This enables users to tailor their environment according their preferences more comprehensively.

Each device, service or application typically has its own access control mechanism. In addition to device operation settings, there are thus also an increasing number of various personal access and usage preference related data, such as credentials for device access, service access and different accounts, personal favourites, etc.

Such information may be considered as profile information that is personal and may be shared by a group, such as the family. Personal profiles typically need to be manually set for each device when used for the first time, and profiles are thus strongly bound to physical devices and the local environment. There is an increasing demand to have portable profiles, and to more easily apply the same personal settings and other profile information when travelling, at a hotel room, for example.

SUMMARY

The invention is defined by the features of the independent claims. Some specific embodiments are defined in the dependent claims.

According to a first aspect, there is provided a method, comprising: receiving profile information associated with a user and at least one device connected to a first local private network, providing a profile information transaction comprising profile data associated with the user and the device to a first private distributed ledger in response to successful authentication of the device, providing a profile availability transaction to a public distributed ledger, the profile availability transaction comprising an availability indication of the profile information, receiving a profile request transaction for profile information associated with the user via a public distributed network of nodes storing the public distributed ledger, and in response to validation of the profile request transaction, causing transmission of at least some of the profile information in the first private distributed ledger to a requesting node of the public distributed network.

According to a second aspect, there is provided a method, comprising: detecting need for providing profile information for a user by a node of a second local private network, providing a profile request transaction to a public distributed ledger for obtaining profile information associated with the user, receiving profile information associated with the user from a providing node capable of accessing a first private distributed ledger storing the profile information; and causing provision of at least some of the received user profile information for at least one device connected to the second local private network.

According to a third aspect, there is provided an apparatus, comprising at least one processor and at least one memory including computer program code, the at least one memory and the computer program code being configured to, with the at least one processing core, cause the apparatus at least to: receive profile information associated with a user and at least one device connected to a first local private network, provide a profile information transaction comprising profile data associated with the user and the device to a first private distributed ledger in response to successful authentication of the device, provide a profile availability transaction to a public distributed ledger, the profile availability transaction comprising an availability indication of the profile information, receive a profile request transaction for profile information associated with the user via a public distributed network of nodes storing the public distributed ledger, and in response to validation of the profile request transaction, cause transmission of at least some of the profile information in the first private distributed ledger to a requesting node of the public distributed network.

According to a fourth aspect, there is provided an apparatus comprising at least one processor and at least one memory including computer program code, the at least one memory and the computer program code being configured to, with the at least one processing core, to cause the apparatus at least to: detect need for providing profile information for a user by a node of a second local private network, provide a profile request transaction to a public distributed ledger for obtaining profile information associated with the user, receive profile information associated with the user from a providing node capable of accessing a first private distributed ledger storing the profile information; and cause provision of at least some of the received user profile information for at least one device connected to the second local private network.

According to a fifth aspect, there is provided a computer program product or a non-transitory computer readable medium having stored thereon a set of computer readable instructions that, when executed by at least one processor, cause an apparatus to at least carry out the method according to the first aspect or the second aspect.

BRIEF DESCRIPTION OF THE DRAWINGS

Some example embodiments will now be described with reference to the accompanying drawings.

EMBODIMENTS

There is now provided improved sharing of profile information associated with a user by applying a multitude of distributed ledgers. Profile information may generally refer to information for configuring and/or accessing a device and/or a service or application, the profile information being directly or indirectly associated with, and specific to, a user (which may in some cases refer to a set of users).

A distributed ledger may be applied for automatically controlling access to and delivery of the user's profile information. The purpose of the distributed ledger is to record and enforce a verifiable order of events. A distributed ledger can be considered a general database synchronized between many parties, which, at successive time instances, comprises successive states of consensus about a particular matter, here profile information associated with a user. Such states may be reached by the many parties, typically nodes in a peer-to-peer (P2P) network, following a decentralized consensus algorithm. In general, this provides an agreement between the nodes without assuming trust between them. Different service providers may oversee in the distributed ledger that every participant handling the profile information is playing by the rules set by the user.

The profile information may be shared by applying a combination of private and public distributed networks and ledgers to a new environment visited by the user. A public distributed ledger may be applied as a 'bulletin board', such that availability of profile information stored in a private distributed ledger can be advertised without disclosing sensitive information of the owner of the profile information. The public distributed ledger may be applied for access control and validating requests to the profile information stored in the private distributed ledger. A global chain based on a multitude of distributed networks may be applied to securely provide personal profile information for a user travelling or otherwise visiting a new local network of devices capable of applying the profile information.

Figure 1:
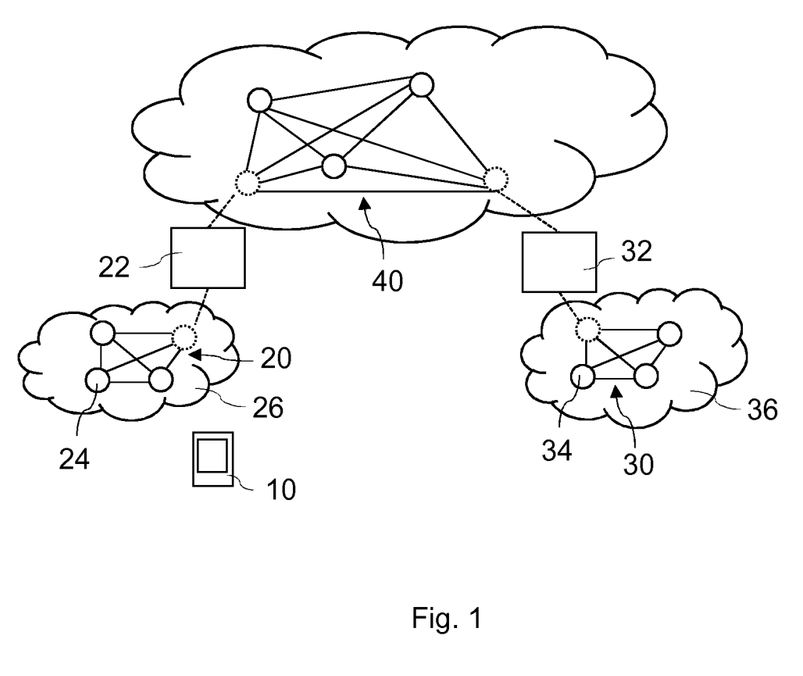
FIG. 1 illustrates an example system according to at least some embodiments.

FIG. 1 illustrates an example system in accordance with at least some embodiments of the present invention. The system comprises a first local private network 20 comprising a plurality of nodes 24. The first local private network 20 may be a private distributed network formed by nodes within a certain local area, such as a home, office premises, workplace premises, factory premises, a hotel, a car, a plane, train or other transportation mean, for example. The nodes may be physical devices connected locally by at least one local wireless network 26, such as a Wi-Fi network or other wireless networking technology type facilitating local connectivity. However, it is to be appreciated that multiple underlying networks and/or different connections may be applied to connect the nodes forming the functional first local private network 20.

The system further comprises a public distributed network 40 formed by nodes storing a public distributed ledger, such as a public blockchain-based network of nodes connected over the internet. The public distributed network 40 may be a global network run by basically any interested parties, and could be built on currently available blockchain system, for example.

The system comprises at least one node 22, which is herein referred to as a providing node. The providing node 22 may be connected to both the first local private network 20 and the public distributed network 40, i.e. may operate as a node in both networks 20, 40. At least some of the nodes 22, 24 of the first private network 20 store a first private distributed ledger. Profile information associated with at least one user is stored in the first private distributed ledger. The providing node 22 may be configured to provide profile information outside the first private network 20 by applying the public distributed network 40.

The system may be configured such that during daily usage, nodes belonging to the first private network 20 can see only each other, and access profile and other information stored on the first private distributed ledger according to assigned right. Multiple personal profiles can be setup if necessary, for example if there are multiple users in one household or if the user simply wants a different sets of settings. There may thus be a plurality of profiles associated with a single user identifier, and different profiles may be identified by specific profile identifiers.

The system further comprises a second private local network 30, which may be similar to the first private local network 20 and comprise a plurality of nodes, which may maintain a second private distributed ledger. A node 32, which is herein referred to as requesting node, is connectable to both the second local private network 30 and the public distributed network 40. The requesting node 32 may be any device having interest to obtain profile information for a user. The requesting node 32 may request profile information associated with the user upon detecting the user, which may refer to detecting a user device, or a specific request of the user for the profile information.

Nodes of the distributed network 20, 30, 40 may share network state information storing all the transactions and history carried out in the network. Network state information stored in the private network 20, 30 may comprise device identifiers and information on allowed connections between at least some of the nodes. The node 22, 32 may be an internet router, a computer/server or a mobile device, for example. As a node on both networks, the node 22, 32 is thus capable of exchanging data between the private distributed network and the public distributed network. For example, the node 22, 32 may be configured to upload/download a personal profile in the private blockchain to/from the public blockchain upon request.

The profile information may comprise configuration parameters for configuring operation of one or more devices of the private network 20, 30 and/or access data for accessing one or more devices of the private network 20, 30 and/or services or applications by or via the one or more devices of the private network 20, 30. It is to be appreciated that these devices may be nodes 24, 34 of the private network and/or devices connected to and/or controlled by the node. For example, a building automation control device may operate as a node of the private network and send control signals on the basis of the profile information to actuator devices, such thermostats, air condition devices, etc.

As an example, the profile information may comprise personal identification information on the basis of which a smart lock of a rented apartment or hotel room is configurable such that the user may open the lock with his or her UE 10. In another example, the profile information comprises user's personal credentials to video streaming service, which are automatically provided to a local entertainment system or application when the visiting user or the UE 10 is identified. A still further example is a car or other type of means of transport for the user, the user environment and user interface of which may be automatically configured on the basis of the imported profile via the distributed networks.

A user device 10, which may also be referred to as equipment (UE), may be a device of the user associated with the profile information and may at least in some embodiments represent the user in the system. The user device 10 may be applied for adding, controlling, and/or using profile information which is stored in the private ledger. In some embodiments, the user device 10 is capable of operating as a node of at least one of the first private network 20, the second private network 30, and the public distributed network 40.

The user device 10 may be configured to access and in some embodiments cause modification of at least one of the first private distributed ledger, the second private distributed ledger, and the public distributed ledger. The user device may be applied as a means to authenticate the user and request the profile information via the requesting node 32 and the public distributed network 40 when the user device is visiting the second local private network 30 or a node 32, 34 or a network 36 associated to the second local private network 30.

The networks 26, 36 may comprise one or more IoT devices configurable on the basis of at least a portion of the profile information. At least some of these IoT devices may operate as nodes of the respective private network 20, 30. The private distributed network 20 blockchain may be applied to ensure that personal IoT devices and information on the chain are secure and private.

The nodes in the private networks 20, 30 may comprise corporate, authority, and/or user devices, such as a server, a desktop/tablet/laptop computer, a smartphone, a domestic appliance, building automation device, entertainment system device, a vehicle unit, a wearable, or any other suitable electronic device. The system may comprise an administrator or management node, a hub, relay or other kind of intermediate device, in some embodiments the node 22, 32, for connecting a node to further networks or services, such as another distributed or centralized computing system or a cloud service. The nodes are mutually addressable in a suitable way, for example, they may be connected to an internet protocol, IP, network. Messages released into the IP network with a recipient address are routed by the network to the recipient node identified by the recipient address. IP is not the only suitable networking technology used, for example, other peer-to-peer networking models are also suitable.

Figure 2:
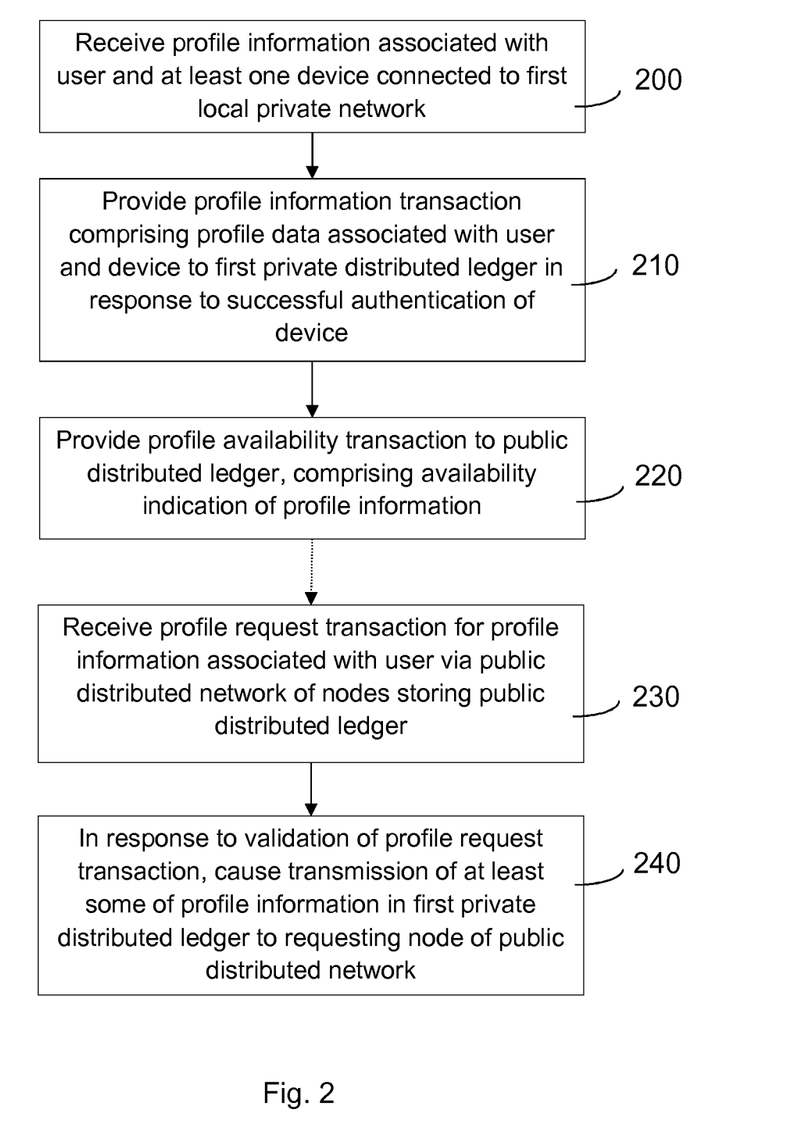
FIGS. 2 to 6 illustrate methods in accordance with at least some embodiments.

FIG. 2 illustrates a method according to some embodiments. The method may be applied for device profile information sharing by a node of a distributed network. The method may be implemented in an apparatus or device capable of providing or mediating user profile information, such as a router device e.g. set as a home edge router, a wireless access network device, a network management device, a network operator device, or a set of devices co-operatively providing the profile information. The method may be implemented by the providing node 22.

Profile information associated with a user and at least one device connected to a first local private network is received 200. Block 200 may be entered upon detecting a new device, new profile information and/or user in the first private network, and may be based on a specific profile information addition request from the device. A profile information transaction comprising the profile information associated with the user and the device is provided 210 to a first private distributed ledger in response to successful authentication of the device. Hence, the profile information may become available in the first local private network nodes after validation of the transaction and updating of the first private distributed ledger. It is to be noted that also the user may be authenticated in connection with block 210, before the profile information can be provided to the distributed ledger.

A profile availability transaction is provided 220 to a public distributed ledger. The profile availability transaction comprises an availability indication of the profile information. The profile availability transaction may identify properties/characteristics of the profile information and/or indicate the associated user. For example, the profile availability transaction may comprise information on the devices and/or profile data type, and a public key of the user. The profile availability transaction may comprise identification information for obtaining the profile information, such as an identifier of the providing node 22.

Provision of a transaction may refer generally to generating the transaction and sending it for further node(s) of the distributed network, such as for validation by validating nodes and subsequent publication in the respective distributed ledger. Validation of a transaction may comprise authentication of associated entities, in some embodiment verifying the cryptographic signature in the transaction, and may comprise checking entitlement of a requesting entity to the requested transaction. In some embodiments, transactions are validated by blockchain miner nodes on the basis of applied blockchain validation mechanism.

A profile request transaction may be received 230 later for profile information associated with the user via a public distributed network of nodes storing the public distributed ledger. The request may be received directly or indirectly from a requesting node of the public distributed network, such as the node 32. The transaction is validated, in some embodiments by a set of validating nodes of the public distributed network. In response to successful validation of the profile request transaction, at least some of the profile information in the first private distributed ledger may be transmitted 240 to the requesting node of the public distributed network. The profile information may be transmitted via an encrypted link and/or the profile information may be encrypted, by public key of the user, for example.

Figure 3:
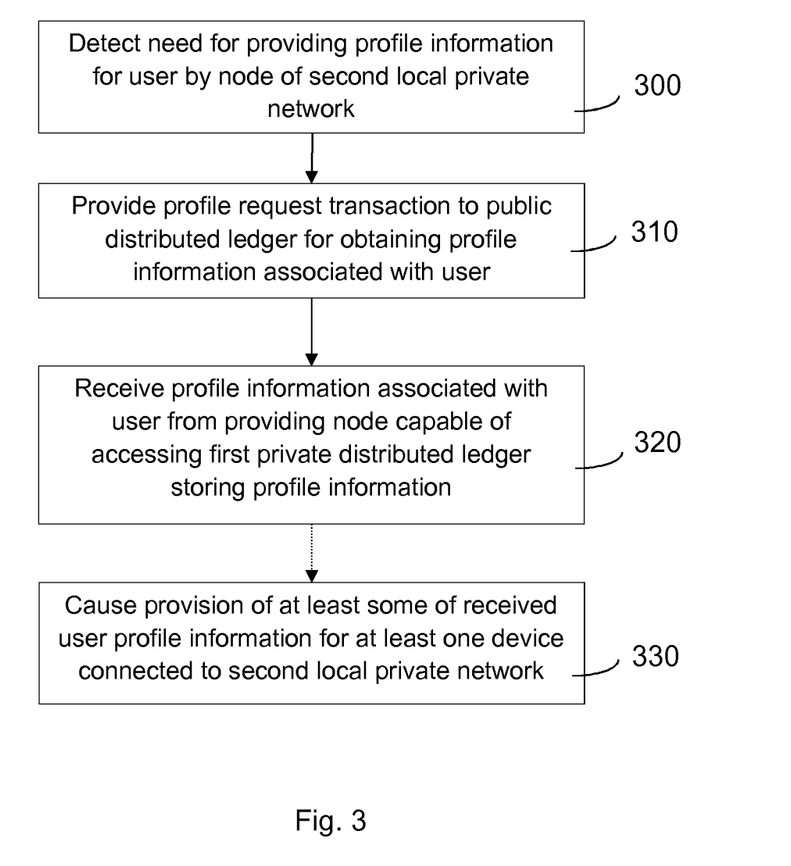

FIG. 3 illustrates a method according to some embodiments. The method may be applied for obtaining device profile information by a node of a distributed network. The method may be implemented in an apparatus or device capable of requesting user profile information, such as a router device e.g. set as home edge router, a wireless access network device, a network management device, a network operator device, or a set of devices co-operatively providing the profile information. The method may be implemented by the requesting node 32.

A need for providing profile information for a user a second local private network is detected 300. The user may be visiting the second local private network and a user device may connect the network. User information may be entered into a device connected to the second local private network or operating as a node of the network directly by the user, automatically from the user device, or via a service person or a further device. The need may be detected upon detecting a user device associated with the user by a node of the second local private network, on the basis of detecting a specific request of the user (which may be received from the user device), or on the basis of receiving user's identification information, for example.

A profile request transaction is provided 310 to a public distributed ledger for obtaining profile information associated with the user. The profile request transaction may be received in block 230 and comprises an indication of the requested profile information. The profile request transaction may identify the profile availability transaction that indicates or points to the user profile information of interest.

Profile information associated with the user is received 320 from a providing node capable of accessing a first private distributed ledger storing the profile information. Block 320 may be entered after block 240 and validation of the profile request transaction in the public distributed network. The profile information may be received via an encrypted link and/or the profile information may be encrypted, by public key of the user, for example. At least some of the received user profile information is (caused to be) provided 330 for at least one device connected to the second local private network.

In some embodiments, the profile request transaction 230, 310 indicates a request for profile transfer for the user device visiting the second local private network. The requesting node may be a configured to provide at least some of the received user profile information for the user device connected to the second local private network. The profile information may then be applied in the user device on the basis of user input and/or instructions in the user profile information and/or the user device, for example. The profile information may be sent from the user device to one or more devices of the second local private network (directly or via further device(s)) to configure operation of the device(s) to meet user preferences.

It will be appreciated that FIGS. 2 and 3 illustrate main features of the procedure for offering and providing the profile information and a number of further steps and embodiments may be applied, some of which are illustrated further below. For example, there may be subsequent block (s) involving a response to the request transaction indicating the validation of the request transaction (provided in connection with block 240).

Access to the profile information may be authorized for the requesting device directly upon the response/validation or after further intermediate action(s). Means for accessing the profile information, in some embodiments an encryption key for decrypting the profile information received and stored in encrypted form, may be provided to the requesting node, in some embodiments as additional blocks of FIGS. 2 and 3.

As a further example, there may be one or more intermediate blocks between blocks 230 and 240 for checking if the user allows or has allowed provision of the user information in response to the profile request transaction. It will be also appreciated that there may be further blocks regarding transaction validation after providing 210, 220, 310 a transaction to the distributed ledger. Further, it will be appreciated that the transaction may be published at the distributed ledger and the method may proceed to a subsequent step only after successful validation of the transaction.

A smart contract may be applied in the public distributed network 40 for controlling sharing of the user profile information. The smart contract may comprise code for verifying user profile transmission to the requesting node 32. For example, a multi-signature verification may be required, in which the profile request transaction need to be appropriately signed by the user or at least one of the first local private network and the requesting node 32, and the signatures are verified in order to validate the request transaction.

It is also to be noted that in response to the validation of the profile request transaction, a further transaction, which may be referred to as profile information release transaction, may be generated for issuing the profile information by the providing node 22 to the requesting node 32. Hence, the transmission of the profile information in block 240 may be triggered upon validation of such profile information release transaction (that has been generated in response to the validation of the profile request transaction). The profile information release transaction may be generated by the smart contract in the public distributed network 40.

In some embodiments, a profile availability transaction associated with the user may be identified amongst transactions stored in the public distributed ledger before or after block 310. The profile request transaction may be provided 310 to the distributed ledger on the basis of and identifying the profile availability transaction. The requesting node 32 may thus after block 300 search through the public ledger to identify transaction(s) associated with the user, such as the user's public key, transaction ID, or other identification (stored in the ledger on the basis of the profile availability transaction 220) as search input. Alternatively or additionally, other identification information may be associated with the profile information, such as identification information of the first local private network, and used as search key.

In an embodiment, identification information for obtaining the profile may be obtained from the user device 10 visiting the second network, in connection with block 300. For example, the user device 10 may provide a transaction ID of the profile availability transaction which is included in the profile request transaction. In another example, the user device provides identification information of the providing node 22 or the first local private network 20, on the basis of which the profile request transaction is generated 310. Anonymization may be applied for identification information associated with the profile information and available in the public distributed network 40.

In some embodiments, new IDs are assigned periodically for the nodes associated with the profile information in the public distributed network, such as the providing node 22 and/or the user device 10. This facilitates to avoid potential information leak from the public network, for instance a criminal could wait on the public network for a profile transfer request to a specific ID representing the digital identity of user's route on the public network as an indication that someone's house has become empty.

Figure 4:
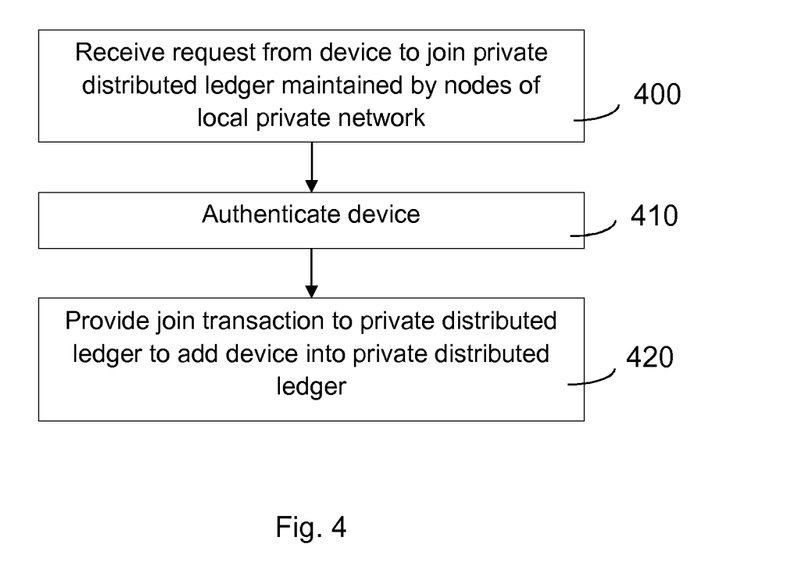

With reference to FIG. 4, in some embodiments, a specific access control or join procedure is applied for the first and/or second private distributed ledger and/or the network 20, 30. The join procedure may comprise: receiving 400 a join request of a requesting device to join the first private distributed ledger. The device is authenticated 410, and after successful authentication and possible other access control functions, the device may be added as part of the private distributed ledger. Thus, a join transaction may be provided 420 to the first private distributed ledger to add the device into the first private distributed ledger.

In some embodiments, the requesting device is a new device, such as an IoT device, newly connected to the local private network 20. Upon accepting the device to be added 420 to the first private distributed ledger, profile information associated with the device and the user may be added in the first distributed ledger. The device may then become a node 24 of the first local private network 20.

In some embodiments, the method of FIG. 4 is applied for adding the user device 10 to the second private distributed ledger maintained by the nodes 32, 34 of the second private network 30. The joining procedure may be temporary, e.g. for the duration of the visit of the user in the local environment.

In some embodiments, a shared accession control procedure is carried out among at least some of the nodes of the private network 20, 30 in response to the join request 400 of the requesting device being a candidate node. Thus, more than one of the network nodes is involved in the decision making regarding the request. The nodes share private network state information, which is updated with information on the candidate node in response to the accession control procedure allowing the candidate node to join the network.

The group of nodes may comprise one or more administrator nodes. The administrator node(s) carry out the accession control procedure and determine if the candidate node may join the network. This may involve prompting a user of an administrator device and/or checking an accession control parameter. One of the administrator nodes may be selected e.g. by a random selection procedure to decide if the candidate node may be added to join the network, for example by using a Proof-of-Work (PoW) protocol or a Proof-of-Stake (PoS) protocol. The accession control procedure may be a distributed consensus procedure. In some embodiments, the accession control procedure comprises carrying out a vote procedure amongst the administrator nodes. Reference is also made to patent application no. PCT/FI2016/050732 disclosing embodiments of such shared accession control, at least some of which may be applied herewith.

Figure 5:
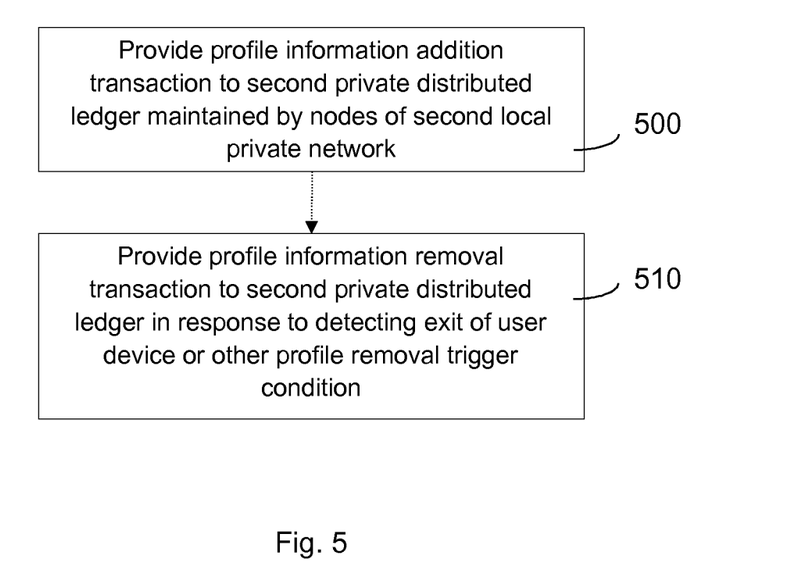

With reference to the method of FIG. 5, in some embodiments, the profile information is added to the second private distributed ledger maintained by the nodes of the second local private network. Block 500 may be entered after block 320, and the received user profile information is provided 500 to the second distributed ledger. The user profile information in the second distributed ledger may be (caused to be) removed 510 in response a trigger condition. The trigger condition may comprise detection of the user's device 10 to exit the second private network, change in user's status information associated with the second private network 30, or some other profile removal trigger condition.

In some embodiments, a user input indicating profile information to be requested is received by the user device. An indication of the requested profile information may be included in the profile request transaction 230, 310 on the basis of the received user input.

In some embodiments, the first private distributed ledger and/or the second private distributed ledger is updated on the basis of the transmission of the profile information after block 240 and/or 320. The public distributed ledger may, in addition to or instead of updating the first and/or second private distributed ledger, be updated to indicate the transmission of the profile information to the requesting entity. The distributed ledger update may be carried out by at least one transaction indicative of the profile information transmission to the second private distributed ledger and/or the public distributed ledger. Thus, all profile information exchanges may be recorded and tracked later.

The public distributed ledger enables a decentralized, auditable, and tamper- proof registry of privacy permissions for sharing profile information. There are strong benefits for using the present decentralized system instead of centralized provision of user's sensitive data. Firstly, parties wouldn't need to trust each other, which is particularly relevant when monetary transactions take place in the system. Secondly, the middleman may be avoided. Let us consider an example scenario: if a single party has control over such a platform, it is possible that a conflict of interest might arise, whereby it would be in the party's interest to censor the information as a consequence. Further, by applying at least some degree of automatisation, the user may be relieved of the need to participate manually. Hence, a distributed ledger is very suitable for such an application.

A protocol for providing user profile information or exchanging the user profile information for a reward is thus enabled without intermediation of a centralized third party. The profile information can be used for variety of purposes. For example, interested parties may thus exchange a monetary reward for profile information. Example applications of such a protocol are, for instance: selling personal profile information for research purposes, participating in research that requires data exchange, exchanging the profile information to a benefit from a device developer, etc.

Figure 6:
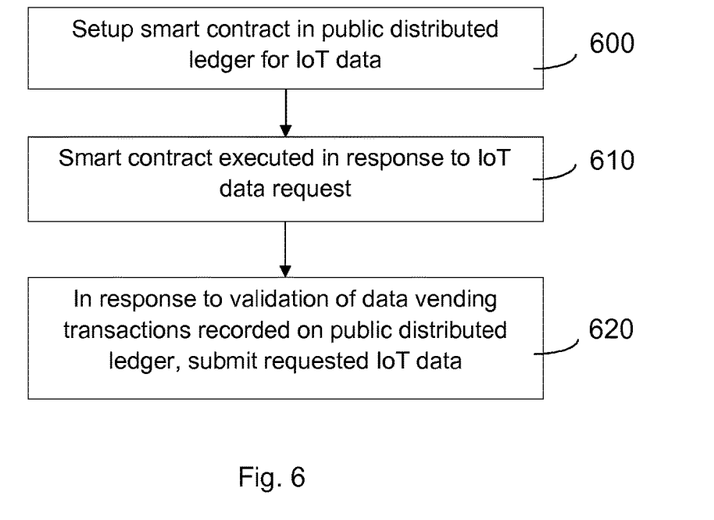

FIG. 6 illustrates a further application of the multitude of distributed networks, in which the system may be used for profile data trading or exchanging the profile information for an asset, such as cryptocurrency value. A smart contract is set up 600 in the public distributed ledger for exchange of the profile information, in the present example IoT data. Block 600 may be entered by the providing node 22 after causing storage of the IoT data in the private distributed ledger by block 210, for example. On the basis of a profile request (e.g. in block 230), the smart contract is executed 610. Transaction(s) associated with the smart contract are carried out and validated. The transactions are cryptographically signed and represent respective issuer's commitment in the exchange. After validation of the transaction(s), the public distributed ledger is updated with the transaction(s). The providing node 22 may send the requested IoT data to the requesting entity, such as the requesting node 32 or another entity, such as a node of the public distributed network or a device outside the public distributed network 40.

In some embodiments, the profile request transaction comprises information of an asset, such as cryptocurrency value, offered in exchange of providing the profile information associated with the profile availability transaction. A response to the profile request transaction 230, 310 may indicate the user's willingness to participate in the exchange of the user information and the asset. The request transaction may comprise a signed authorization to issue the asset in response to validation of the exchange. The validation of the exchange may thus be triggered in response to the validation of the profile request transaction, i.e. after block 240. After the validation of the exchange, the authorization is executed and the exchange may be carried out.

In some embodiments, the profile request transaction, or a further transfer transaction validation based on the profile request, comprises multi-party computation, which may comprise: verifying an account indicated in the transaction and verifying that an encryption key provided by the user equipment decrypts the profile information provided by the user equipment in encrypted form. A transaction is issued for releasing the asset for the user and the encryption key is provided for the requesting node in response to successful validation of the exchange. A transfer transaction may be issued by the requesting node to the account for releasing the asset for the user in response to successful validation of the exchange. Then, the encryption key may be provided for the requesting device in response to successful validation of the exchange. The presently disclosed features facilitate to avoid trust issues around reward offered in response to disclosing the profile information associated with the user.

In some embodiments, the distributed networks 20, 30, 40 are blockchain based networks, the distributed ledgers are blockchain ledgers, and the transactions are blockchain transactions. The nodes 22, 24, 32, 34 may be light or full blockchain nodes. Information provided in a blockchain transaction, such as the above illustrated profile information related transactions, may be stored in the blockchain ledger in response to validation of the respective blockchain transaction.

Figure 7:
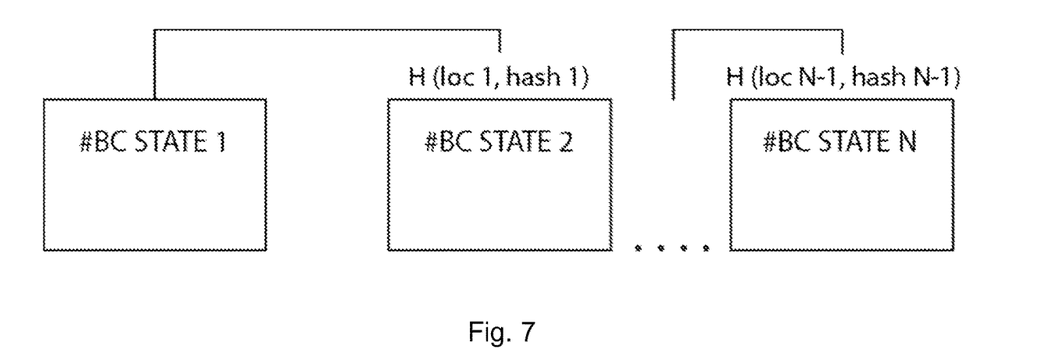
FIG. 7 illustrates a blockchain.

With reference to FIG. 7, the blockchain is an ordered sequence of blocks. When a new block is established, it is added to the blockchain as a most recent established block. A block comprises a time-stamped batch of transactions representing the state of the block at the time. A block may further comprise a hash pointer H with location indicator 'loc' and hash value 'hash' to a prior block, which immediately precedes the block in the blockchain, linking thus the blocks together. Blockchain state information shared by the nodes may store all the transactions and history carried out in the respective network 20, 30, 40. For example, after deciding on allowing the candidate node to join the network 420, a new block comprising updated blockchain network state information may be added.

Each node may comprise the ledger whose content is in sync with other ledgers. The nodes may validate and commit transactions in order to reach consensus. Each node may have their own copy of the ledger which is in some embodiments permission- controlled, so participants see only appropriate transactions. Changes in resource ownership in the blockchain take the form of blockchain transactions secured by strong cryptography. A blockchain transaction may comprise an identifier of a new owner, that is the recipient, of the resource, together with a cryptographic signature of the previous owner, that is the sender, such that malicious attackers cannot re-assign resources they do not own.

To establish a next block, the transaction is provided (e.g. by or in response to block 210, 220, 310, 420, 500, 510) into the blockchain network 40, 60, which generally refers to a dissemination method suitable for the context, which will cause the transaction to be communicated to at least some of the nodes of the network in general. Reaching each and every node with each and every transaction is not strictly necessary.

A node establishing the next block may be known as a miner node. A miner node may compile a set of transactions, which it receives from the broadcasts, for the next block, and search for a proof-of-work code that covers all the transactions in the set of transactions for the next block. For example, the proof-of-work code may be a numerical value, with which the contents of the next block, that is, the set of transactions, hashes to a value that is less than a threshold. Once a miner discovers the proof-of-work, it can publish the block, which other nodes of the system will then add to the blockchain as the new most recent established block with proof of work code field. In case the miner node discovers a proof-of-work based on an incomplete set of transactions, for example if some transactions did not reach the miner node, other nodes in the network will not accept the block into the blockchain, and it will be excluded from a consensus version of the blockchain in the system.

Although discussed above in terms of proof-of-work, in some embodiments a proof-of-stake may be used instead of, or additionally to, a proof-of-work. In a proof-of- stake based system, a new block is accepted once a sufficient fraction of resources are proven as owned by nodes ready to accept the new block version.

Once a new block is established, the blockchain becomes longer. A transaction is considered the more reliable, the larger the number of blocks established since the block where the transaction is comprised. This is since transactions are hashed into the chain of blocks, and discrepancies in the block chain are resolved as the block chain gets longer. In each next block N in the sequence, a hash of the previous block hash N-1 may be included along with the transactions, attaching the blocks to each other to form the chain. Hashes linking the blocks together to form a chain may be referred to as Merkle hashes. Maliciously modifying a transaction in a block far down the chain would involve re-doing the work of finding proofs for all subsequent blocks, since the input to the hash function for the block comprising the transaction would be changed, causing the resulting hash value, with the proof in that block, to no longer be disposed in the desired area in the output space of the hash function.

Figure 8:
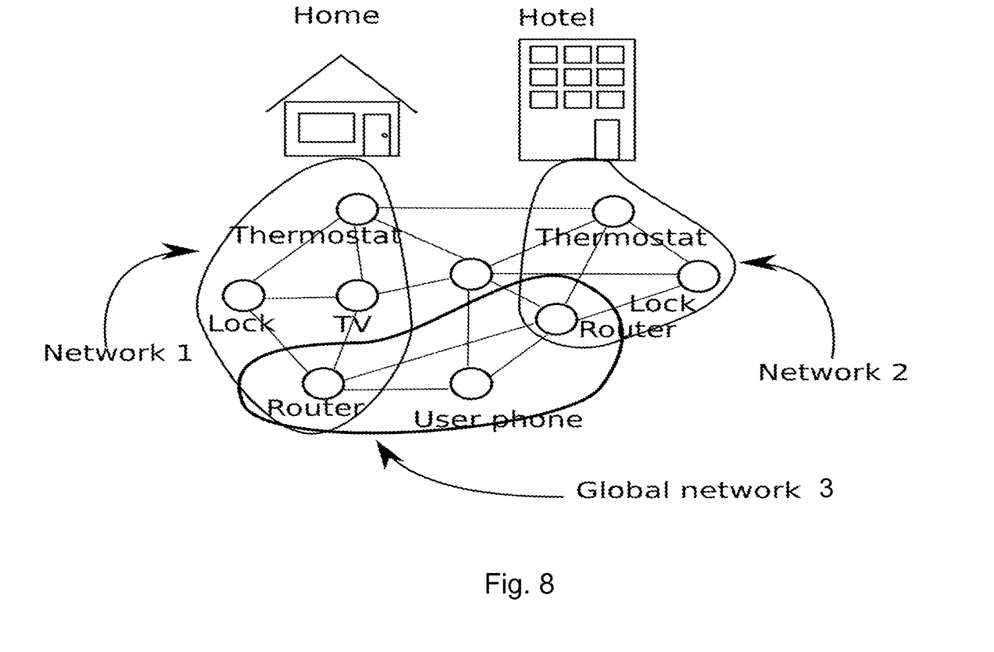
FIG. 8 illustrates an example system comprising networks of IoT devices.

FIG. 8 illustrates an example of a simplified system comprising two private local networks 1, 2 of IoT devices and a public blockchain network in which IoT data as the profile information may be shared by applying at least some of the above illustrated embodiments. Routers operate on the edges of the home and hotel private local network and the global public network, which may be a global network, and may be configured to function as the providing node 22 and the requesting node 32, respectively. In the example of FIG. 8, IoT data of lock and thermostat devices of the home network 1 may be provided via the global network to the hotel network 2 visited by the user.

The user device may be configured to operate as a node of the public distributed network via which IoT profile information may be shared via the public distributed network. Thus, in some embodiments, a user device may operate as the providing node 22 and/or the requesting node 32.

For example, when the user arrives at a hotel or other rented space/room comprising at least some IoT device(s) configurable similar as at IoT device(s) home with profile configuration feature like his own, he can use the global blockchain to request his home blockchain to send a specific personal profile to target hotel router. All authentications of related devices (mobile phone, home router, hotel router) and profile transferring process is controlled by the global blockchain. The user can also specify the details of the profile to be transferred as to what part of profile is needed, e.g thermostat setting, TV subscription and lock security level etc. for a hotel room, and for how long. Then at the end of his stay, the hotel's local blockchain will remove the temporary profile and related information. So the user needs not to worry about the leakage of his personal information.

With reference also to FIG. 6, the user of the IoT devices owns the data on his private blockchain and can opt to share the data with or sell the data to third parties over the global public chain. The trading process can be completely automatic with smart contracts. Data generated by rented IoT devices can also be exchanged on global blockchain. For instance, on hotel check-in, the user will decide if hotel's IoT system can track and store his activities or not. If permission is granted, IoT data collected can be sold back to hotel, for instance in exchange for cheaper rate. The data bought back by hotel will be anonymous and may only contain non-personal information. The user will also have options to retain himself and/or delete all the IoT generated data from hotel IoT system. The options can be setup using smart contract in hotel IoT blockchain and pushed to user on joining the ledge on check-in. Afterword, IoT data can be processed automatically according details specified in the smart contract.

An electronic device comprising electronic circuitries may be an apparatus for realizing at least some embodiments of the present invention. The apparatus may be or may be comprised in a computer, a laptop, a tablet computer, a cellular phone, a machine to machine (M2M) device, a wearable device, a base station, access point device, a network management or control device, a server, or any other apparatus provided with communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

Figure 9:
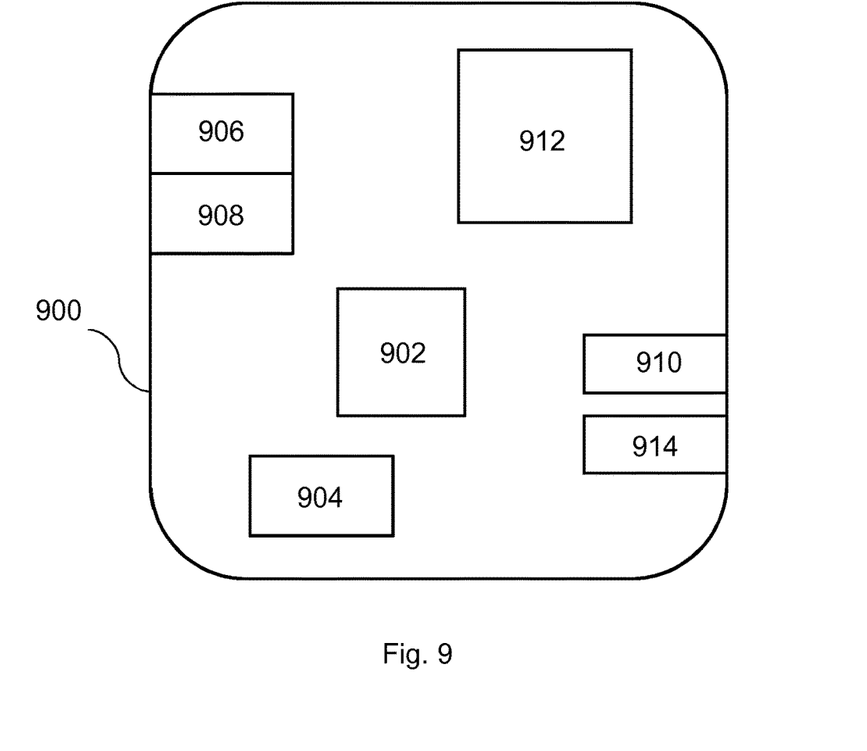
FIG. 9 illustrates an apparatus in accordance with at least some embodiments of the present invention.

FIG. 9 illustrates an example apparatus capable of supporting at least some embodiments of the present invention. Illustrated is a device 900, which may comprise a communications device in some embodiments arranged to operate as a node in a blockchain-based system. The device may be arranged to operate as the UE 10, the profile information requesting node (e.g. the node 32 of FIG. 1), or the profile information providing node (e.g. the node 22), and carry out at least some of the embodiments illustrated in connection with FIGS. 1 to 6. The device may include one or more controllers configured to carry out operations in accordance with at least some of the embodiments illustrated above, such as at least some of the features illustrated above in connection with FIGS. 1 to 8.

Comprised in the device 900 is a processor 902, which may comprise, for example, a single- or multi-core processor wherein a single-core processor comprises one processing core and a multi-core processor comprises more than one processing core. The processor 902 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform action to carry out at least some of the presently disclosed features.

The device 900 may comprise memory 904. The memory may comprise random-access memory and/or permanent memory. The memory may comprise at least one RAM chip. The memory may comprise solid-state, magnetic, optical and/or holographic memory, for example. The memory may be at least in part accessible to the processor 902. The memory may be at least in part comprised in the processor 902. The memory 904 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 900 but accessible to the device. For example, control parameters affecting operations related to causing the above-illustrated transactions and related information may be stored in one or more portions of the memory and used to control operation of the apparatus.

Further, the memory may comprise device-specific cryptographic information, such as secret and public key of the device 900. The transactions may be signed with a private key associated with the respective device and/or user. The apparatus may be provided with a public-private key pair at manufacture. The private key may be stored on the certifying device's secured memory portion, such that it cannot be tampered with and the private key cannot be stolen. Moreover, the secured portion may also hold the hashing and signing logic.

The device 900 may comprise a transmitter 906. The device may comprise a receiver 908. The transmitter and the receiver may be configured to transmit and receive, respectively, information in accordance with at least one wired or wireless, cellular or non- cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, wireless local area network, WLAN, and/or Ethernet standards, for example. The device 900 may comprise a near-field communication, NFC, transceiver 910. The NFC transceiver may support at least one NFC technology, such as NFC, Bluetooth, Wibree or similar technologies.

The device 900 may comprise user interface, UI, 912. The UI may comprise at least one of a display, a keyboard, a touchscreen, a vibrator arranged to signal to a user by causing the device to vibrate, a speaker and a microphone. A user may be able to operate the device via the UI, for example to accept incoming telephone calls, to originate telephone calls or video calls, to browse the Internet, to manage digital files stored in the memory 904 or on a cloud accessible via the transmitter 906 and the receiver 908, or via the NFC transceiver 910, and/or to play games.

The device 900 may comprise or be arranged to accept a user identity module or other type of memory module 914. The user identity module may comprise, for example, a subscriber identity module, SIM, and/or a personal identification IC card installable in the device 900. The user identity module 914 may comprise information identifying a subscription of a user of device 900. The user identity module 914 may comprise cryptographic information usable to verify the identity of a user of device 900 and/or to facilitate encryption and decryption of communication effected via the device 900, such as the private and/or public keys as illustrated above.

The processor 902 may be furnished with a transmitter arranged to output information from the processor, via electrical leads internal to the device 900, to other devices comprised in the device. Such a transmitter may comprise a serial bus transmitter arranged to, for example, output information via at least one electrical lead to memory 904 for storage therein. Alternatively to a serial bus, the transmitter may comprise a parallel bus transmitter. Likewise the processor may comprise a receiver arranged to receive information in the processor, via electrical leads internal to the device 900, from other devices comprised in the device 900. Such a receiver may comprise a serial bus receiver arranged to, for example, receive information via at least one electrical lead from the receiver 908 for processing in the processor. Alternatively to a serial bus, the receiver may comprise a parallel bus receiver.

The device 900 may comprise further devices not illustrated in FIG. 9. For example, the device may comprise at least one digital camera or other user media recording device. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 910 and/or the user identity module 914.

The processor 902, the memory 904, the transmitter 906, the receiver 908, the NFC transceiver 910, the UI 912 and/or the user identity module 914 may be interconnected by electrical leads internal to the device 900 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

References throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. The skilled person will appreciate that above-illustrated embodiments may be combined in various ways. Embodiments illustrated in connection with FIGS. 2 to 8 may be taken in isolation or further combined together.

Various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in communications.

ACRONYMS LIST

ASIC Application-specific integrated circuit
FPGA Field-programmable gate array
GSM Global system for mobile communication
IC Integrated Circuit
LTE Long term evolution
NFC Near-field communication
PoS Proof-of-stake
PoW Proof-of-work
UI User interface
WCDMA Wideband code division multiple access
WLAN Wireless local area network

REFERENCES

Patent application no. PCT/FI2016/050732

The invention claimed is:

1. An apparatus comprising at least one processor; and at least one memory including computer program code for one or more programs, the at least one memory and the computer program code configured to, with the at least one processor, cause the apparatus to perform at least the following:
   receive profile information associated with a user and at least one device connected to a first local private network,
   provide a profile information transaction comprising the profile information associated with the user and the at least one device to a first private distributed ledger in response to successful authentication of the at least one device,
   provide a profile availability transaction to a public distributed ledger, the profile availability transaction comprising an availability indication of the profile information,
   receive a profile request transaction, based on the profile availability transaction, for profile information associated with the user via a public distributed network of nodes storing the public distributed ledger, and
   in response to validation of the profile request transaction, cause transmission of at least some of the profile information in the first private distributed ledger to a requesting node of the public distributed network.

2. The apparatus of claim 1, wherein the apparatus is further caused to perform:
   receive a join request of the at least one device connected to the first local private network to join the first private distributed ledger,
   authenticate the at least one device, and
   provide a join transaction to the first private distributed ledger to add the at least one device into the first private distributed ledger.

3. The apparatus of claim 1, wherein the profile request indicates a request for profile transfer for the user visiting a second local private network, and the requesting node is a configured to provide at least some of the profile information for at least one device connected to the second local private network for configuring operation of the at least one device connected to the second local private network according to the profile information.

4. An apparatus comprising at least one processor; and at least one memory including computer program code for one or more programs, the at least one memory and the computer program code configured to, with the at least one processor, cause the apparatus to perform at least the following:
  detect a need for providing profile information for a user by a node of a second local private network,
  provide, on the basis of a profile availability transaction associated with the user and stored in a public distributed ledger, a profile request transaction to a public distributed ledger for obtaining profile information associated with the user, the profile availability transaction comprising an availability indication of the profile information,
  receive profile information associated with the user from a providing node capable of connecting a first local private network and accessing a first private distributed ledger storing the profile information; and
  cause provision of at least some of the received user profile information for at least one device connected to the second local private network.

5. The apparatus of claim 4, wherein a second private distributed ledger is maintained by nodes of the second local private network, and wherein the apparatus is further caused to perform:
  provide the received user profile information to the second distributed ledger, and
  cause removal of the user profile information in the second distributed ledger in response a trigger condition.

6. The apparatus of claim 5, wherein the apparatus is further caused to perform:
  receive a request from a user device associated with the user to join the second private distributed ledger,
  authenticate the user device, and
  provide a join transaction to the first private distributed ledger to add the user device into the second private distributed ledger.

7. The apparatus of claim 4, wherein the apparatus is further caused to perform:
  identify the profile availability transaction associated with the user amongst transactions stored in the public distributed ledger, and
  the profile request transaction identifies the profile availability transaction.

8. The apparatus of claim 4, wherein a user input indicating profile information to be requested is received, and
  an indication of the requested profile information is included in the profile request transaction on the basis of the received input.

9. The apparatus of claim 4, wherein the apparatus is further caused to perform:
  provide at least one transaction indicative of the profile information transmission to the private distributed ledger and/or the public distributed ledger.

10. The apparatus of claim 4, wherein the profile information comprises one or more of configuration parameters for configuring operation of one or more IoT devices of the private network for the user, access data for accessing one or more devices of the private network, and access data for accessing services or applications by the one or more devices of the private network.

11. The apparatus of claim 4, wherein the distributed ledgers are blockchain ledgers.

12. A method, comprising:
  receiving profile information associated with a user and at least one device connected to a first local private network,
  providing a profile information transaction comprising the profile information associated with the user and the at least one device device to a first private distributed ledger in response to successful authentication of the at least one device,
  providing a profile availability transaction to a public distributed ledger, the profile availability transaction comprising an availability indication of the profile information,
  receiving a profile request transaction, based on the profile availability transaction, for profile information associated with the user via a public distributed network of nodes storing the public distributed ledger, and
  in response to validation of the profile request transaction, causing transmission of at least some of the profile information in the first private distributed ledger to a requesting node of the public distributed network.

13. The method of claim 12, further comprising:
  receiving a join request of the at least one device connected to the first local private network to join the first private distributed ledger,
  authenticating the at least one device, and
  providing a join transaction to the first private distributed ledger to add the at least one device into the first private distributed ledger.

14. The method of claim 12, wherein the profile request indicates a request for profile transfer for the user visiting a second local private network, and the requesting node is a configured to provide at least some of the profile information for at least one device connected to the second local private network for configuring operation of the at least one device connected to the second local private network according to the profile information.

15. The method of claim 12, further comprising:
  providing at least one transaction indicative of the profile information transmission to the private distributed ledger and/or the public distributed ledger.

16. The method of claim 12, wherein the profile information comprises one or more of configuration parameters for configuring operation of one or more IoT devices of the private network for the user, access data for accessing one or more devices of the private network, and access data for accessing services or applications by the one or more devices of the private network.

17. The method of claim 12, wherein the distributed ledgers are blockchain ledgers.

18. A method, comprising:
  detecting need for providing profile information for a user by a node of a second local private network,
  providing, on the basis of profile availability transaction associated with the user and stored in a public distributed ledger, a profile request transaction to a public distributed ledger for obtaining profile information associated with the user, the profile availability transaction comprising an availability indication of the profile information,
  receiving profile information associated with the user from a providing node capable of connecting a first local private network and accessing a first private distributed ledger storing the profile information; and
  causing provision of at least some of the received user profile information for at least one device connected to the second local private network.

19. The method of claim 18, wherein a second private distributed ledger is maintained by nodes of the second local private network, and the method further comprising:

providing the received user profile information to the second distributed ledger, and causing removal of the user profile information in the second distributed ledger in response a trigger condition.

20. The method of claim 18, further comprising:

receiving a request from a user device associated with the user to join the second private distributed ledger, authenticating the user device, and providing a join transaction to the first private distributed ledger to add the user device into the second private distributed ledger.

* * * * *